United States Patent
Dierkes

[11] 3,888,563
[45] June 10, 1975

[54] OBSERVATION AND MEASURING STAND FOR OPTRONIC DEVICES IN A VEHICLE

[75] Inventor: Hermann Dierkes, Vellmar, Germany

[73] Assignee: Rheinstahl Henschel Aktiengesellschaft, Kassel, Germany

[22] Filed: Dec. 4, 1973

[21] Appl. No.: 421,614

Related U.S. Application Data

[62] Division of Ser. No. 159,127, July 2, 1971, Pat. No. 3,796,478.

[30] Foreign Application Priority Data

| July 7, 1970 | Germany | 2033589 |
|---|---|---|
| Aug. 13, 1970 | Germany | 2040284 |
| Aug. 21, 1970 | Germany | 2041603 |
| Aug. 25, 1970 | Germany | 2042089 |

[52] U.S. Cl. .................. 350/85; 350/302
[51] Int. Cl. .......................... G02b 21/24
[58] Field of Search ............ 350/52, 82–85, 350/301, 302

[56] References Cited
UNITED STATES PATENTS

| 2,366,410 | 1/1945 | Klemperer | 350/52 X |
| 2,418,799 | 4/1947 | Willard | 350/84 |
| 2,424,011 | 7/1947 | De Gramont | 350/85 X |
| 2,546,111 | 3/1951 | Rattray | 350/85 X |
| 2,579,903 | 12/1951 | Carbonara | 350/52 X |

*Primary Examiner*—Alfred E. Smith
*Assistant Examiner*—Michael J. Tokar
*Attorney, Agent, or Firm*—Walter Becker

[57] ABSTRACT

An arrangement for supporting an optical and/or electronic observation and measuring device in the top wall of a vehicle so that the upper objective end is above the top wall of the vehicle while the observer's end is below the top and inside the vehicle. The device is suspended from the top wall of the vehicle so as to be swingable like a pendulum in all directions. The arrangement includes a lock to hold the device against swinging when the vehicle is in motion and also includes fine leveling devices to adjust the axis of the device to a vertical position when the vehicle is stationary and further includes a device for adjusting the device angularly about its own axis. The device includes an observer's seat which is nontiltably connected to the optical device so as to swing therewith.

16 Claims, 18 Drawing Figures

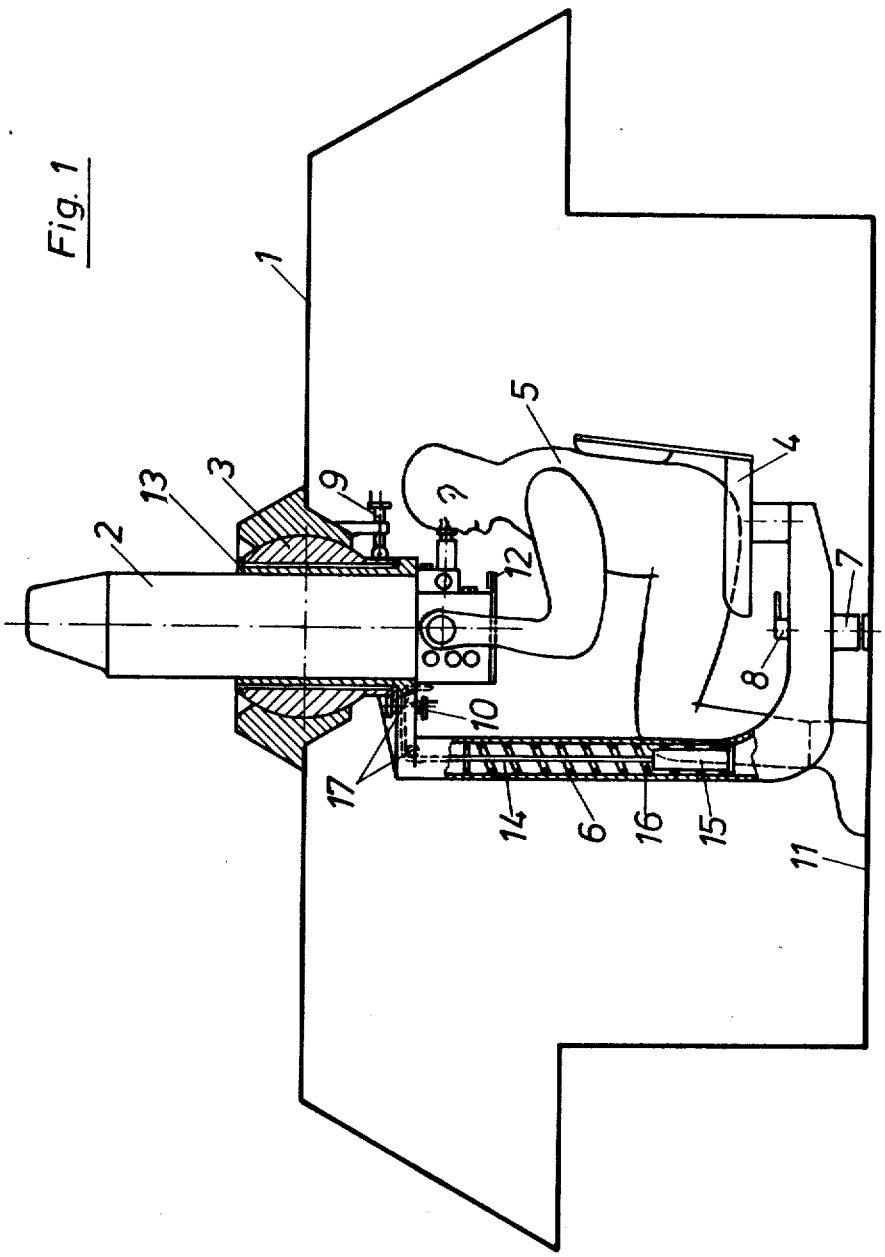

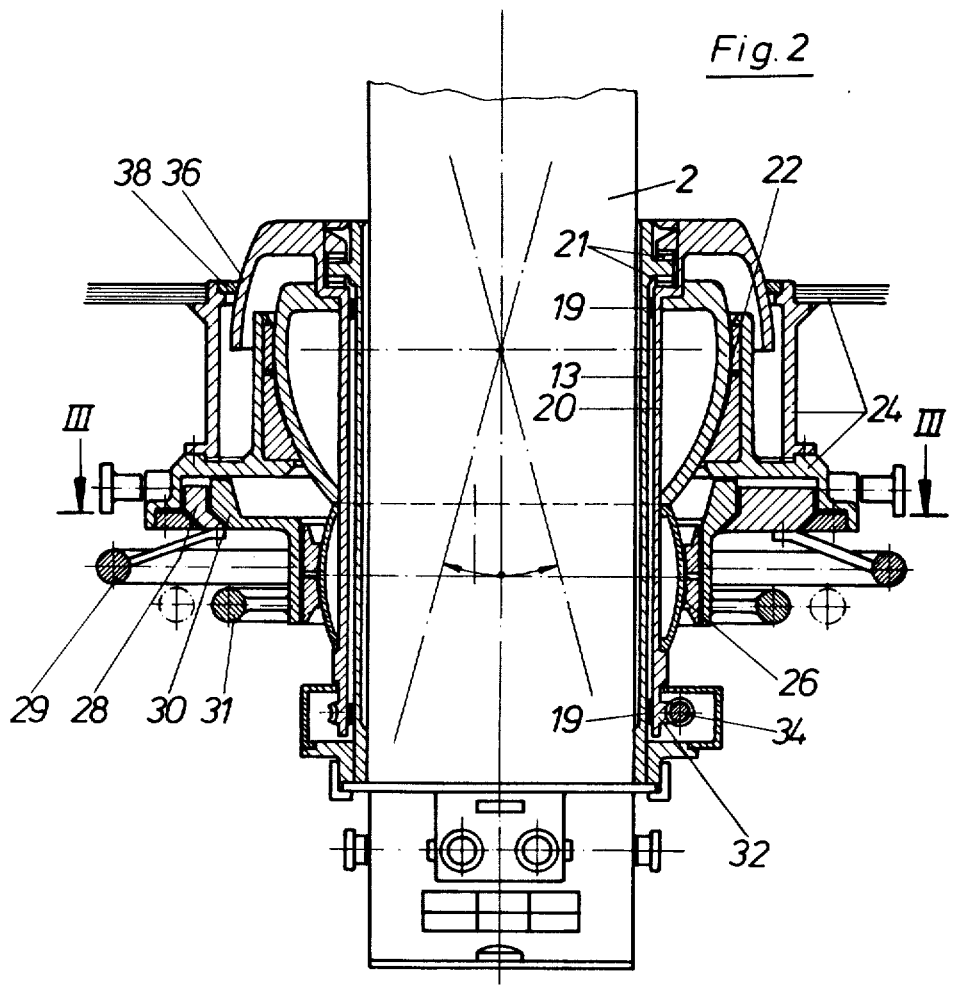

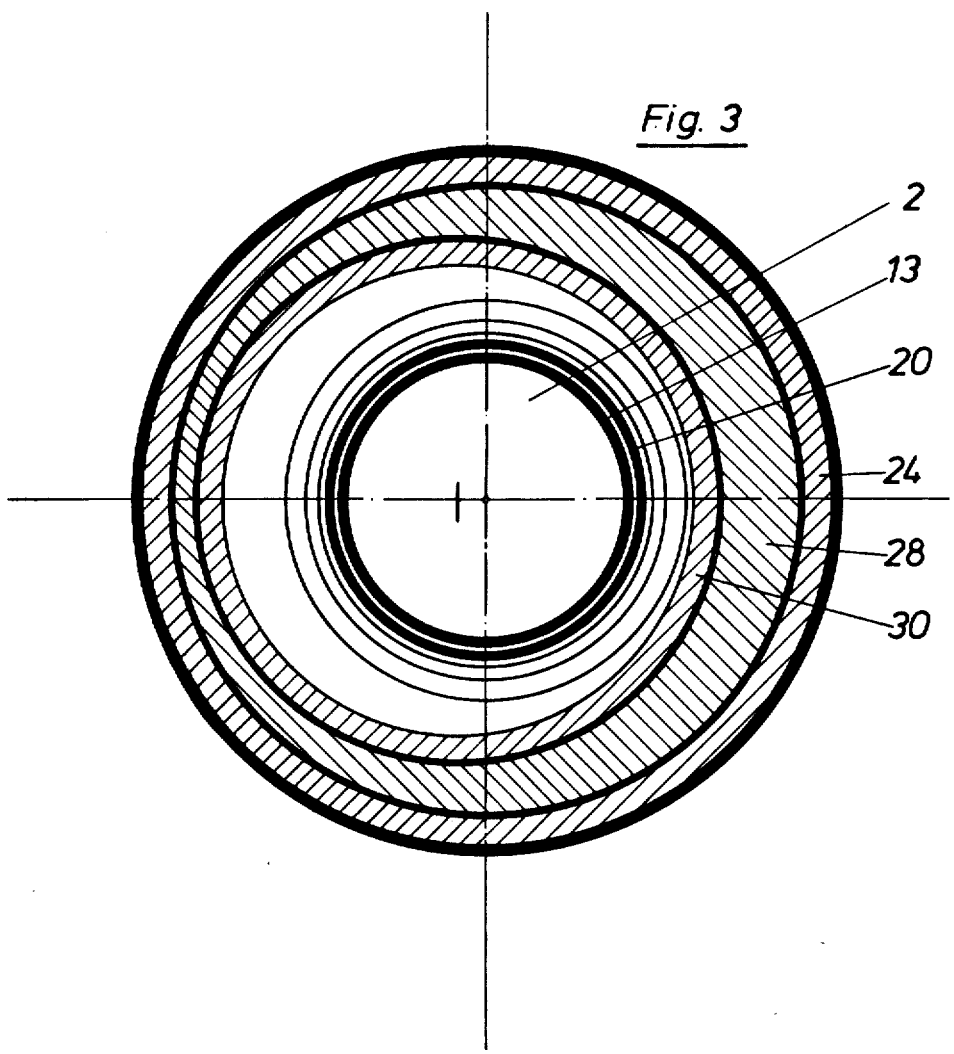

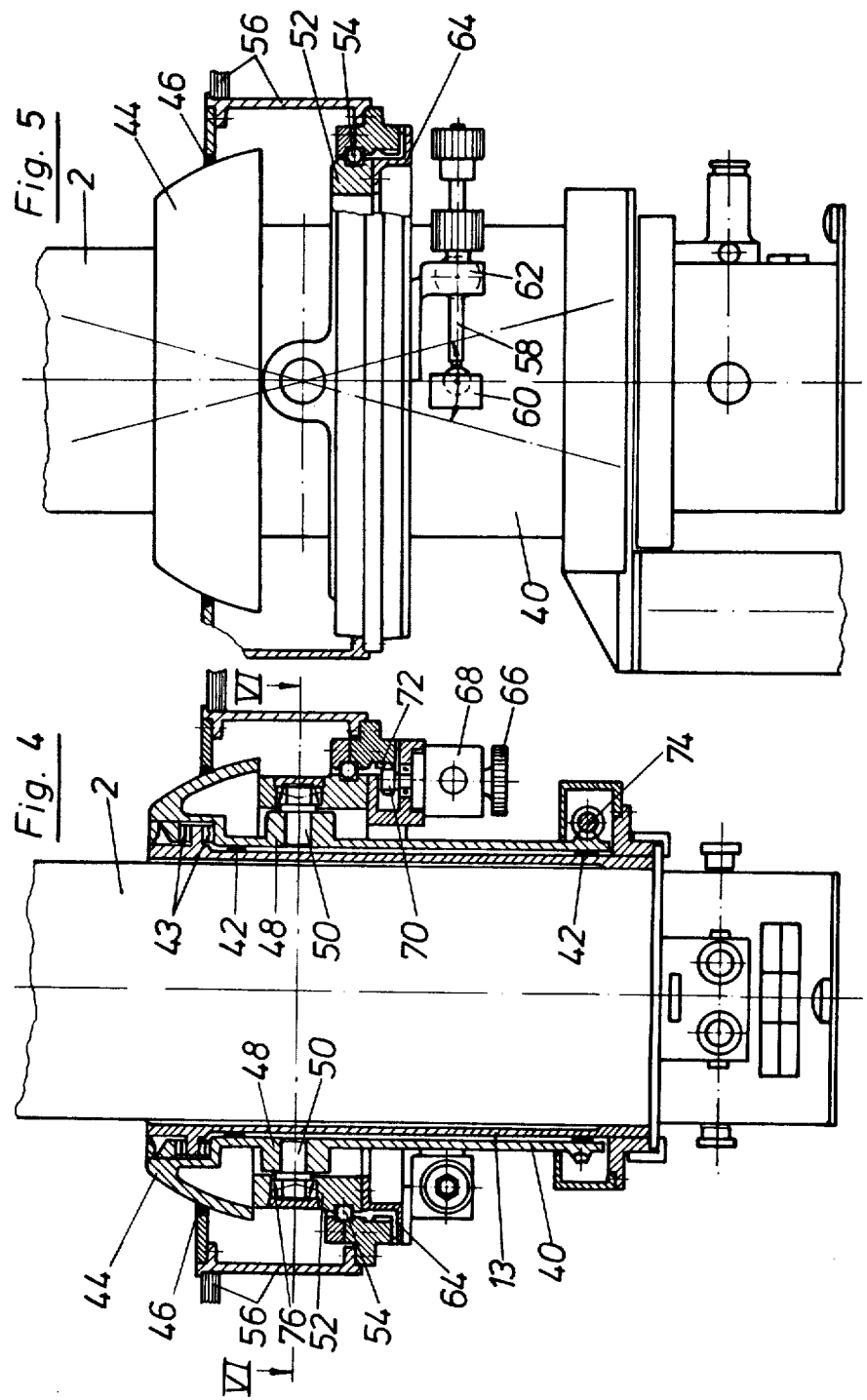

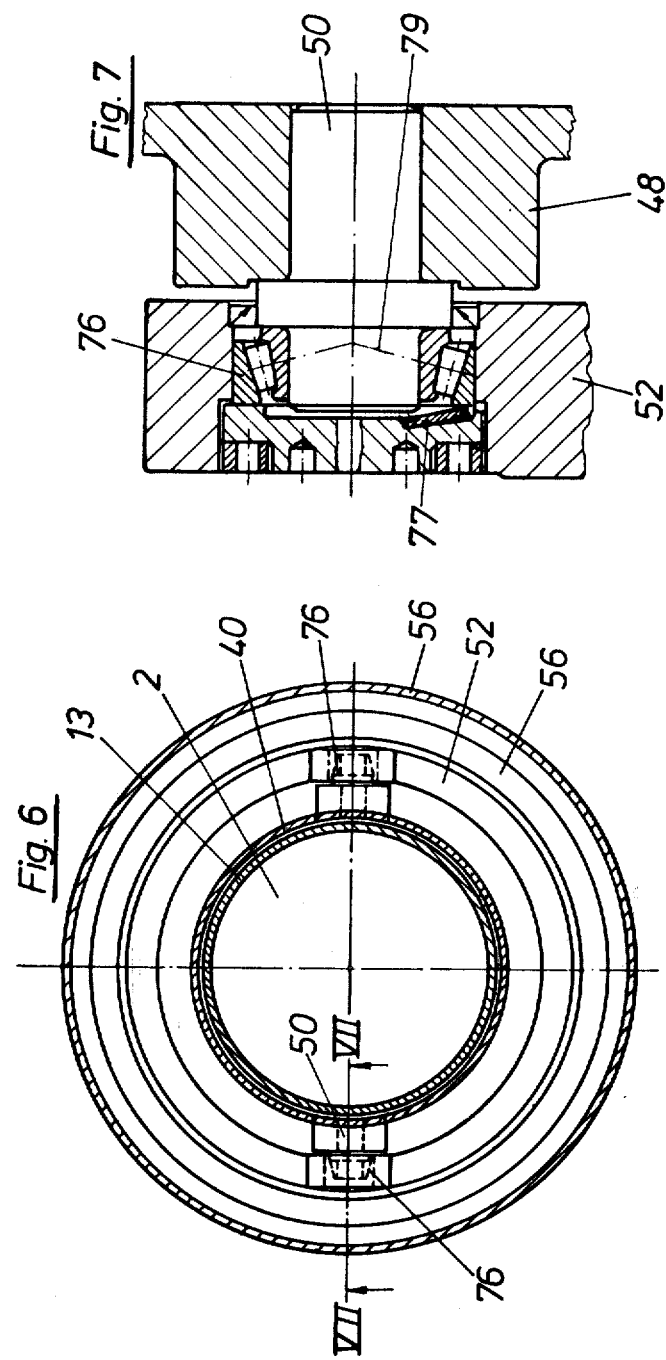

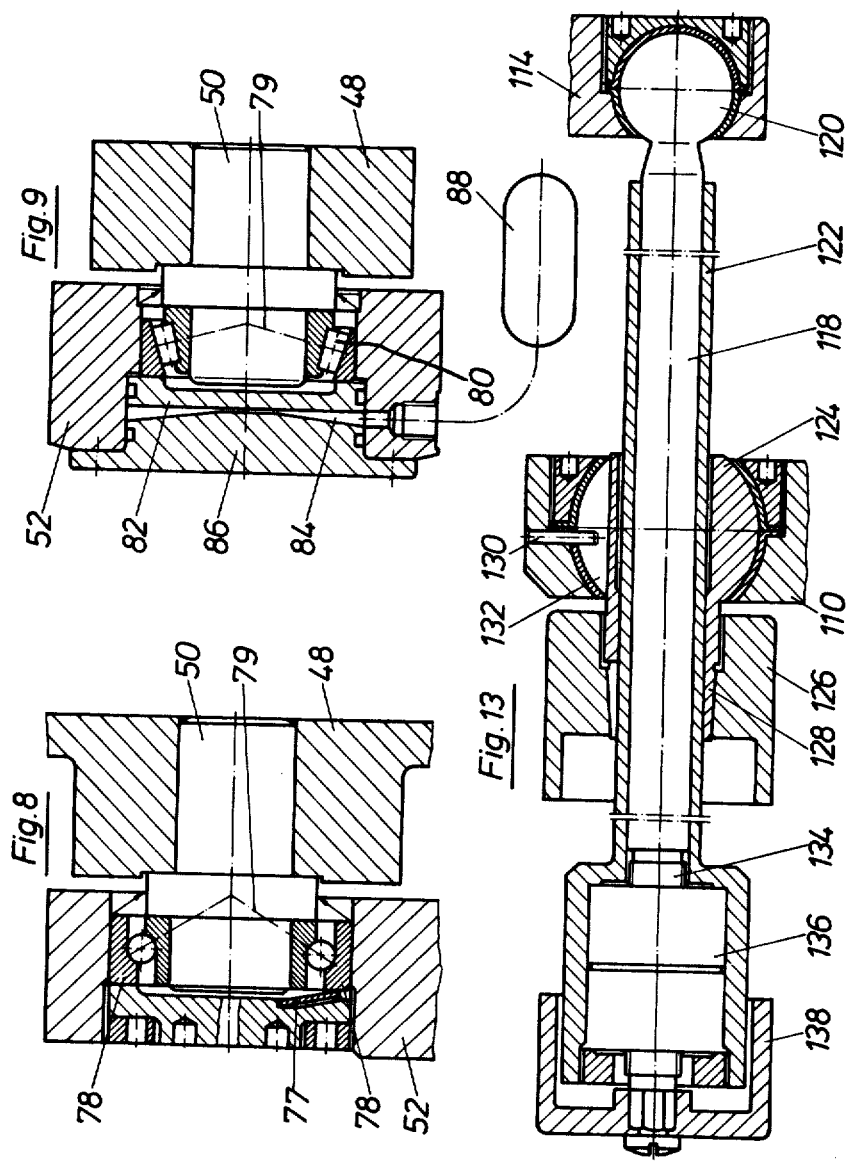

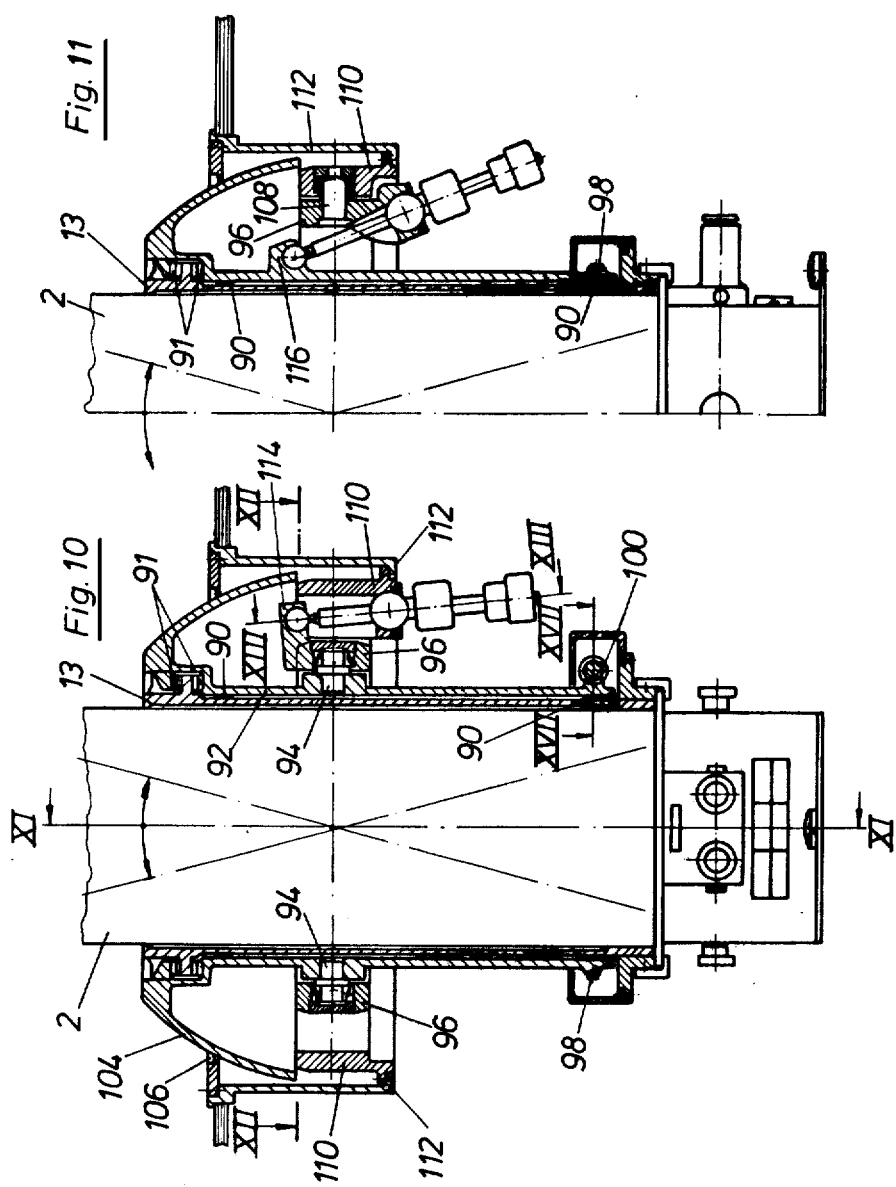

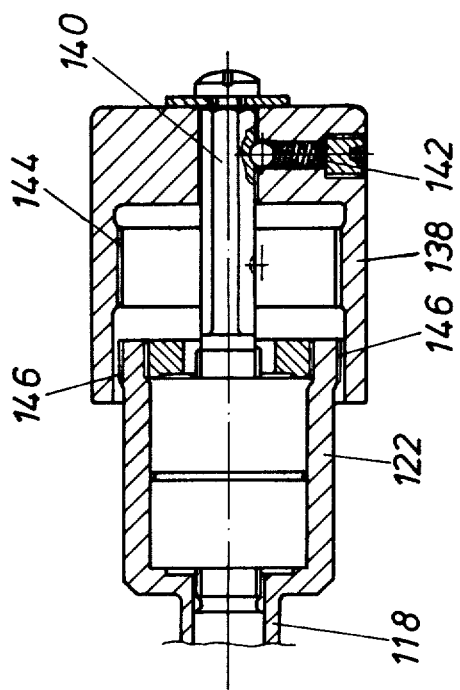
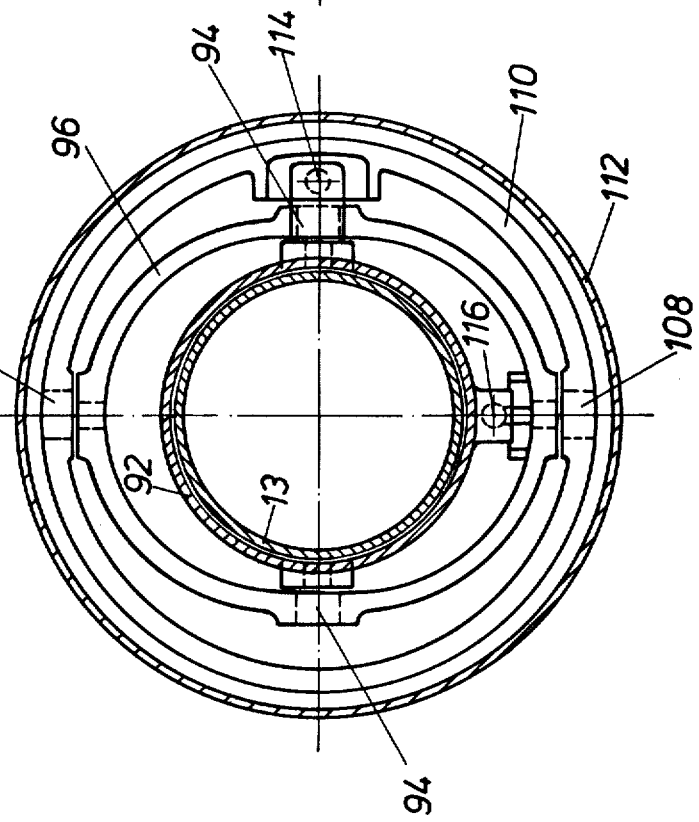

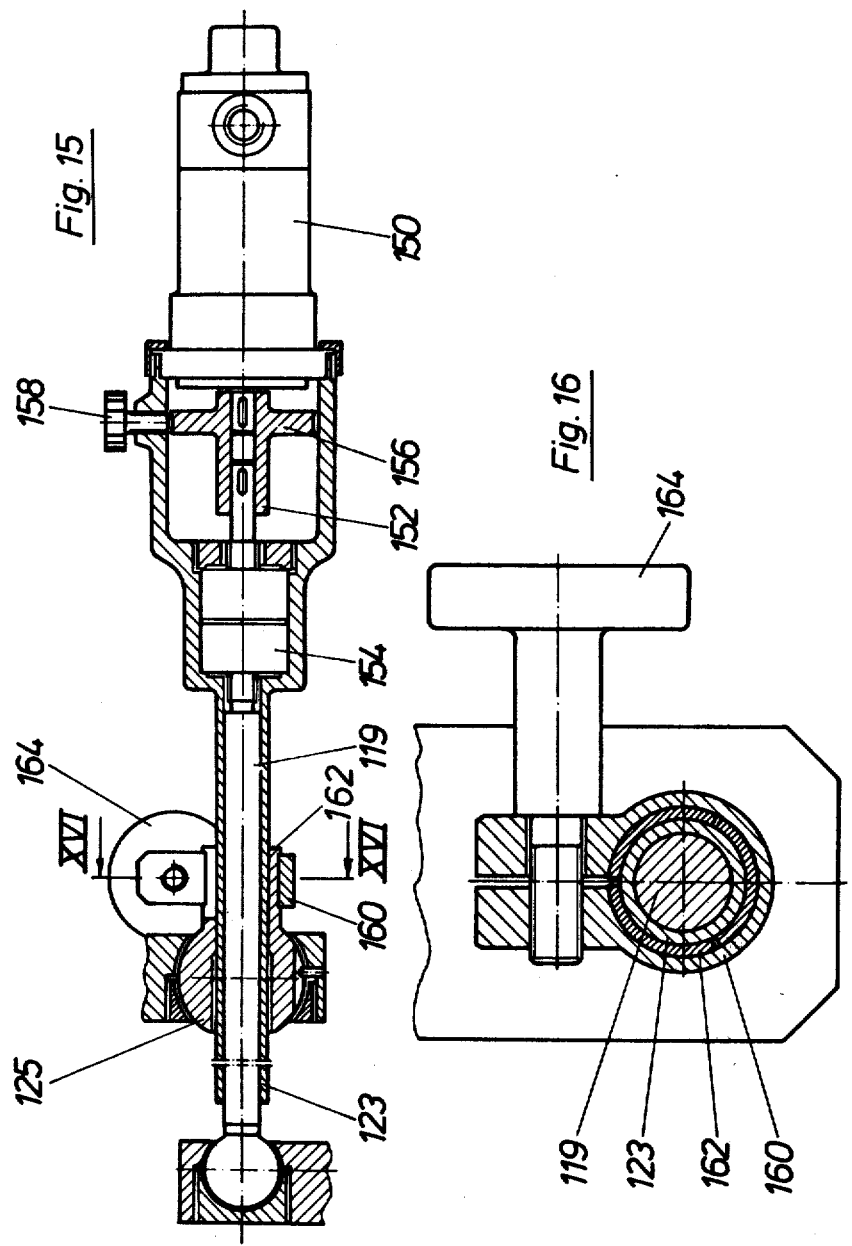

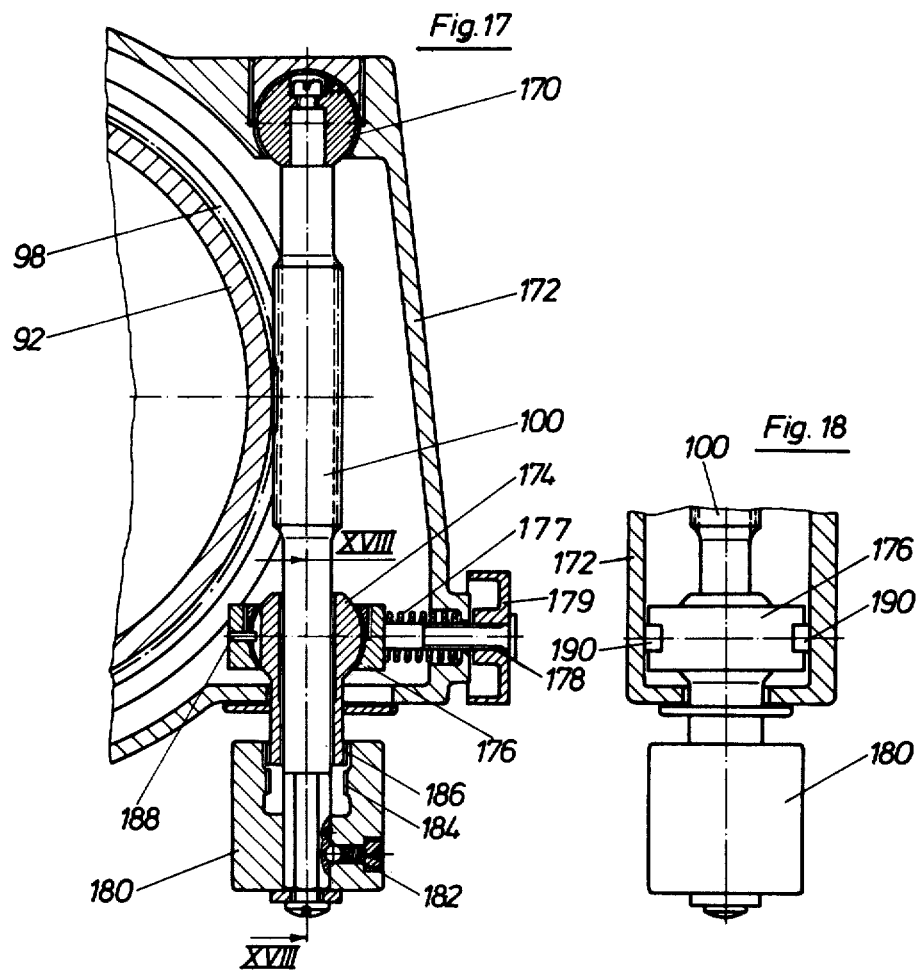

OBSERVATION AND MEASURING STAND FOR OPTRONIC DEVICES IN A VEHICLE

This is a division of co-pending application Ser. No. 159,127-Dierkes filed July 2, 1971, now U.S. Pat. No. 3,796,478-Dierkes issued Mar. 12, 1974.

The invention relates to an observation or measuring stand for optronic devices in a vehicle, especially an armored vehicle, for observing and measuring targets from the interior of the vehicle.

In conformity with the respective military employment purpose of such observation and measuring stand, generally the following technical conditions are given:

The pure observation and measuring operation from heretofore known armored vehicles is possible by means of optical devices of the fighting unit of armored vehicles while the leveling and the finding of the bearing would be effected by means of a three-axle stabilized platform. Such employment of the military vehicle is, however, too expensive and would greatly impair the fighting ability of the vehicle, which fighting ability also requires a three-axle stabilizing during the movement of the vehicle.

Inasmuch as the observation and measuring is necessary only when the vehicle is at a standstill, the installation of optronic devices into a three-axle stabilized platform is too expensive. On the other hand, such observation and measuring stand must already with regard to its ability of solving the military problem, assure a high measuring precision also if the vehicle is inclined for some reasons, and must be readily and quickly movable into readiness of operation while the device should require only a relatively small space in the vehicle.

Also, the employment of an optronic device with a two-axle stabilized reflector head is out of question because such a device would complicate its optical ray path to such an extent that the price thereof would cause too great an increase in the cost of the entire arrangement, especially with the usually necessary binocular sight.

It is known to carry out such observation and measuring operations in terrains, especially from trenches, by means of a periscope which is mounted on a tripod and which prior to carrying out the observation or measuring operation is leveled. The leveling is effected in a coarse manner by correspondingly mounting the tripod, and a fine leveling is carried out by means of an adjustable three-point suspension of the periscope on the head of the tripod. A mounting of the tripod in a vehicle for carrying out observation and measuring operations is out of the question because it would take up too much space in the vehicle. Also, the connection of the optronic device by means of a three-point suspension on the roof of the vehicle is practically not possible because on one hand its range of adjustability for the coarse and fine adjustment of the leveling operation relative to the vehicle is insufficient, and on the other hand the adjustment is not so manifest that a fast leveling would be possible.

The above outlined problem has been solved by a device according to the present invention which is characterized primarily in that the optronic device is suspended in the vehicle so as to be rotatable azimuthally and free from play and is adapted to be unlocked or unclamped for its working position in such a way that it is universally movable about one point and is adapted to be leveled therewith while the observer is seated in a frame which is fixedly connected to the optronic device in such a way that the observer will carry out all movements of the device for the leveling and the azimuthal rotation and thus will, relative to the view of the device, always be located in the same favorable position. The entire suspended system is, as far as its weight is concerned, and if necessary with the employment of counter weights, so designed that the center of gravity will be located below the universal suspension point in the vehicle roof and primarily in the azimuth axis of rotation while the observer on the said suspension does not find any foot rests but has his feet on the floor of the vehicle, while the entire observation and measuring stand is suspended in the manner of a pendulum and is rotatable. In this way, by moving his body and keeping his feet still, the observer will be able to move the observation and measuring stand. Only during a rotary movement of the observation and measuring stand will the observer's feet occupy a variable position. For the movement toward the leveling adjustment and also for the azimuth rotation, play-free manually operable fine adjusting means are provided.

According to a further development of the present invention, it is suggested to design the manually fine adjusting drives so as to be disengageable in order to permit the observer to carry out a fast coarse adjustment of the observation or measuring stand by his own weight or by pushing-off movements of his feet relative to the vehicle floor. Furthermore, the adjusting devices for the leveling operation may be adapted to be locked in order to prevent undesired adjustment of the leveling during the observing and measuring action. In customary manner, a level is mounted on the optronic device to aid the leveling operation. The manually operable fine adjusting transmissions may be of a mechanical or hydraulic or electric type. The optronic device may be movable relative to the suspension and in the direction of its axis.

The invention will be more clearly understood upon reference to the following detailed specification taken in connection with the accompanying drawings, in which:

FIG. 1 shows a portion of a vehicle embodying the invention;

FIG. 2 is a detailed sectional view through one form which the swivel mount for the optical device can take;

FIG. 3 is a plan sectional view indicated by line III—III on FIG. 2;

FIG. 4 is a sectional view like FIG. 2 showing a modified arrangement for tilting the optical device;

FIG. 5 is a view looking in from the left side of FIG. 4 partly in section and showing the mechanism for tilting the optical device;

FIG. 6 is a plan sectional view indicated by line VI—VI on FIG. 4 showing a journal arrangement about which the optical device tilts;

FIG. 7 is a fragmentary sectional view showing one of the bearings for the optical device and is indicated by line VII—VII on FIG. 6;

FIG. 8 is a view like FIG. 7 but shows a different bearing;

FIG. 9 is another view similar to FIG. 7 but shows still another way of creating a preload for the bearing, namely, hydraulically.

FIG. 10 is a view like FIG. 2 but shows another type of mechanism for tilting the optical device;

FIG. 11 is a section on line XI—XI of FIG. 10;

FIG. 12 is a plan sectional view indicated by line XII—XII on FIG. 10 showing a journal arrangement for the column;

FIG. 13 is a view indicated by section line XIII—XIII on FIG. 10;

FIG. 14 is a fragmentary view showing a detail in connection with the adjustment illustrated in FIG. 13;

FIG. 15 is a view like FIG. 13 but shows a modified arrangement;

FIG. 16 is a sectional view indicated by line XVI—XVI on FIG. 15 showing a lock for the adjusting mechanism;

FIG. 17 is a sectional view indicated by line XVII—XVII on FIG. 10; and

FIG. 18 is a sectional view indicated by line XVIII—XVIII on FIG. 17.

Referring now to the drawings in detail, the arrangement shown therein comprises a vehicle at 1, the optronic device 2 which is azimuthally rotatable and adapted to be leveled in the universal suspension 3. The device furthermore comprises a seat 4 for the observer 5, which seat through the frame 6 is connected to the optronic device 2. The reference numeral 7 indicates the locking mechanism which is adapted to be locked and unlocked by means of an actuating handle 8. The device as shown in the drawings furthermore comprises a preferably disengageable fine adjusting mechanism 9 of which two are provided for the leveling about the two axes.

The optronic device 2 is vertically adjustable in the surrounding support sleeve 13 and has connected thereto a member 14 such as a chain, or steel band, extending down the inside of frame 6, which is hollow. Member 14 has connected thereto a weight 15 and a spring 16 bears between the weight and a shoulder thereabove in frame 6. Rollers 17 are provided over which member 14 passes.

The level condition of the optronic device is indicated by a series of levels, one of which is indicated at 12 in FIG. 1.

The leveling devices are arranged between the frame of the vehicle and suspension 3 and are preferably distributed about suspensions 3 and act along lines at angles to each other. One only of such disengageable devices is shown at 9 in the drawing. The device 9 may be manually adjustable or motor operated, as desired.

Also, device 9 may be motor operated between latched and unlatched positions, i.e. either in a working position for fine adjustment of the suspension or in such a position that the suspension can be moved by foot, in which instance the device 9 will be free floating.

The reference numeral 10 designates the preferably disengageable fine adjusting mechanism for the azimuth turning of the entire observation and measuring stand; reference numeral 11 designates the floor of the vehicle.

The fine adjusting mechanism 10 may, for example, comprise a selectively engageable gear drive arrangement for effecting fine adjustment of device 2 angularly about the axis thereof. During angular adjustment of device 2, suspension 3 is non-swingable and device 2 and frame 6 turn as a unit about the axis of device 2.

For further explaining the present invention, there will now be described steps to be carried out when effecting an observation or measuring action by means of a device according to the invention. As long as the vehicle moves, the observation or measuring stand will, in order to avoid unnecessary movements and stresses inherent thereto, be locked.

The device is locked at least against swinging by the locking device 7 which is actuated into locked position by handle 8, or by a suitable motor arrangement. The device may, if desired, be locked against rotation by engagement of mechanism 10. At this time, leveling devices 9 may, or may not, be engaged with suspension member 3. Mechanism 10 may be engageable and disengageable manually or by a motor and may include both motor operated and manual means for rotation of device 2.

Following the somewhat inclined parking of the vehicle at its place of employment, the locking and the fine adjusting means are unlocked or are made ineffective and the observation or measuring stand is coarsely leveled by its own weight as a result of the location of its center of gravity.

More specifically, locking device 7 is unlocked and the two leveling devices 9, if engaged, are released whereupon the entire mechanism becomes free to swing like a pendulum in all directions under the influence of gravity. Further, mechanism 10 is disengaged so the frame 6 and the device 2, together with seat 4, can be rotated on the axis of device 2 to near a desired azimuthal position.

If desired, the observer may correct the adjustment by a corresponding movement of his legs and, more specifically, by pushing with his legs against the bottom of the vehicle. Thereupon the leveling devices 9 are engaged and by means thereof, the observer effects the fine adjustment for leveling by means of one or more levels mounted on device 2 or on bracket 6, and subsequently blocks the leveling movements.

Inasmuch as the disengagement of the locking mechanism and the coarse leveling are effected without requiring any material time, especially when motors are associated therewith, the safety of operation is quickly reached. From this horizontal plane, the target is ascertained by the periscope in conformity with the sight and the level, and with regard to the distance is effected by the laser distance meter. To this end the observer rotates the optronic device 2 (for instance, a binocular periscope with a mirror adjustable in elevation and with a laser distance meter correspondingly pivotable in elevation), by means of the seat suspended thereon and by means of his feet in a coarse manner in the desired direction. Then he engages the fine adjusting mechanism 10 for fine azimuth movement and sights on the target in a precise manner.

Adjustment of device 2 in the vertical direction may be effected by customary means (not shown) for the elevation within the optronic device 2.

FIGS. 2 through 18 show the structure of the device of the present invention in more detail.

In FIG. 2, the optronic device 2 is mounted in sleeve 13 and together therewith is rotatable on bearings 19 and 21 in an intermediate bushing 20. Bushing 20 is fixed to spherical bearing 22 which is journalled in the stationary support 24 fixed to the vehicle frame.

Interposed between support 24 and a spherical bearing 26 on bushing 20 is a pair of eccentrics 28 and 20 having respective hand wheels 29 and 31 fixed thereto.

Bushing 20 at its lower end is provided with a worm wheel portion 32 engaged by a worm 34 on sleeve 13 for rotation of the optronic device relative to the bushing.

The assembly is sealed to the top wall of the vehicle by an inverted spherical pan-like member 36 which is slidable in a seal 38 fixed to the vehicle roof.

FIG. 3 shows the relation between eccentrics 28 and 30 and will show how rotation of the eccentrics relative to support 24 and to each other can bring about tilting of the optronic device to any desired position within the limits of movement thereof.

FIGS. 4, 5 and 6 show a modification wherein the optronic device and bushing 13 in which it is mounted are rotatable in an outer bushing 40 and are journalled therein in bearings 42 and 43. Outer bushing 40 at the top has a spherical portion 44 engaged by a seal 46. Toward the upper end, bushing 40 has bearing portions 48 which receive bearing studs 50 which are journalled at their outer ends in a ring 52 that is, in turn, supported by bearings 54 in stationary support structure 56.

Tilting of the optronic device is accomplished by a screw 58 having a ball and socket connection with bushing 40 at 60 and threaded into an arm 62 by a ball which is connected to the bottom of a ring 64 that is secured to the underside of the aforementioned ring 52 that carried studs 50.

Rotation of ring 52 relative to the axis of the optronic device is accomplished by hand wheel 66 acting through a transmission 68 to rotate a pinion 70 meshing with internal gear 72 formed on the inside of the stationary support structure 56. Transmission 68 is supported on ring 52.

As in connection with the previously described modification, optronic device 2 is rotatable in bushing 40 by means of a worm wheel formed on the lower end of bushing 40 which is engaged by a worm 74 carried by sleeve 13.

Outer bushing 40 together with the optronic device is rotatable relative to the frame of the vehicle by actuation of hand wheel 66 whereas rotation of the optronic device and sleeve 13 relative to bushing 40 is accomplished by actuation of worm 74.

A leveling operation or horizontal orientation in any inclined position of the vehicle may be carried out by so rotating the inner ring 52 of the azimuth bearing—with the bushing 40 suspended therein—by means of the azimuth adjusting mechanism 66, 68, 70, 72 that the axis of the bearing stud 50 is horizontal. This will cancel the edging of the device. By means of the adjusting mechanism 58 having its points of attack at 60 and 62, the bushing 40 is subsequently pivoted about the above mentioned horizontal axis into its vertical position and is thus oriented horizontally.

FIG. 6 shows the trunnions or bearings that tiltably connect bushing 40 to ring 52, and FIG. 7 shows a detail thereof in which it will be seen that each stud 50 has its outer end journalled in ring 52 by tapered antifriction bearings 76.

The several bearings of the various modifications described above are preloaded so as to eliminate play and lost motion in the bearings thereby providing for precise adjustment of the optronic device.

FIG. 7 shows a roller bearing 76 and FIG. 8 illustrates a self-aligning ball bearing 78. In the respective upper portions of FIGS. 7 and 8 the bearings are firmly clamped in between parts 52 and 48 by means of bolts 50, cover and ring nut, the preload being determined by the spring properties of the cardan ring 52. According to the arrangement respectively shown in the lower portions of FIGS. 7 and 8, a spring ring or dish spring is inserted between bearings 76 and 78 on one hand and the cover on the other hand whereby the preload is generated. The conical surfaces of the effect of the forces in the bearings according to FIGS. 7, 8 and 9 are shown at 79.

FIG. 9 shows a still further modification wherein each anti-friction bearing 80 in which the outer end of a respective bearing stud 50 is journalled is backed up by a piston 82 which defines a chamber 84 with a bearing cap 86 and to which chamber fluid is supplied under pressure from a source 88. This arrangement provides for preloading of the bearings and, thereby, playfree supporting of the bushing and the optronic device.

FIG. 10 shows a modified arrangement in which the optronic device 2 in its bushing 13 is supported by bearings 90 and 91 on an outer bushing 92 which is tiltably supported by bearing studs 94 on a ring 96.

The lower end of bushing 92 is provided with a worm wheel portion 98 which is in mesh with a worm 100 on bushing 13.

Bushing 92 at the top is in the form of an inverted spherical member 104 sealingly engaging seal 106 in the top wall of the vehicle.

As will be seen in FIGS. 11 and 12, ring 96 is tiltably supported in a ring 110 on bearing studs 108 which define an axis displaced by 90° from the axis defined by bearing studs 94. Ring 110 is supported stationary in the vehicle by supporting structure 112.

Ring 96 has a lug 114 thereon which is connected by a ball and socket joint to an adjusting mechanism shown in detail in FIG. 13 and operable to tilt ring 96 on the axis defined by bearing studs 108.

Similarly, bushing 92 has a ball and socket connection at 116 with a like adjusting mechanism operable to tilt bushing 92 about the axis defined by bearing studs 94.

This arrangement of the control and adjusting mechanisms between ring 110 on the stationary supporting structure 112 and the cardan ring 96 and between ring 96 and bushing 92 will bring about that the two adjustments will not affect each other so that a speedy and proper leveling or horizontal orientation will be assured.

FIG. 13 shows in detail one of the adjusting mechanisms referred to and both of which may be substantially identical. In FIG. 13, which shows in detail the adjusting mechanism of FIG. 10, a spindle 118 has a ball 120 on one end seated in a socket in member 114 and preferably surrounded by a slippery synthetic material. Spindle 118 is reciprocable in a tube 122 extending through a ball 124 mounted in support structure 110 as in a slippery synthetic material. Conical nut 126 threaded on ball 124 compresses a tapered portion 128 around sleeve 122 for engaging or disengaging the adjusting mechanism. A pin 130 in support structure 110 engages a slot 132 in ball 124 and prevents rotation thereof but permits tilting of the ball in the supporting structure.

Spindle 118 represents the threaded spindle of a well-known so-called planetary spindle. More specifically, spindle 118, at its end opposite ball 120, has threads 134 engaged by a planetary drive 136 which comprises a set of threaded planetary rolls (not shown) and which is clamped in an enlarged end portion of sleeve 122. A hand wheel 138 is adapted to actuate the input side of the planetary drive 136 to reciprocate spindle 118 in sleeve 122.

FIG. 14 shows how hand wheel 138 could be axially reciprocably mounted on the hexagonal end 140 of spindle 118 with detent means 142 providing for two axial positions of the hand wheel on the spindle. In the outer position, in which the hand wheel is shown in FIG. 14, the hand wheel is rotatable but in the inner position, teeth 144 in the hand wheel engage teeth 146 on the enlarged end portion of sleeve 122 and prevent rotation of the hand wheel.

FIG. 15 shows a modification of the adjusting device in which a motor 150 is connected by a coupling 152 with the input member of the planetary spindle drive 154 and the threaded spindle 119. Motor 150 is fixed to an extension of sleeve 123 and the extension has a recess for a flange 156 on the coupling that can be locked by operation of a screw 158. The principle of this planetary spindle drive is the same as that described above in connection with FIG. 13.

As shown in FIG. 15, the ball 125 extends partly and is compressed about sleeve 123 by a clamp 160 (see also FIG. 16), and can be tightened up about the split extension 162 of the ball 125 by a screw 164.

The previously mentioned worm and worm wheel arrangement provided between the optronic device and the bushing in which it is rotatable is shown in FIGS. 17 and 18. In FIGS. 17 and 18, it will be seen that worm 100 has one end supported in a ball 170 pivoted in a framework 172 that is secured to bushing 13 in which the optronic device is rotatably mounted.

The other end of worm 100 is also mounted in a ball 174 supported in a support 176 which is laterally movable toward and away from worm wheel 98 as by availing of the nut and screw means 178. A hand wheel 180 mounted on the worm wheel shaft is provided with detent means 182 so as to have an outer driving position and an inner locked position wherein teeth 184 on the hand wheel engage teeth 186 on ball 174. Ball 174 is held against rotation in its support member 176 by pin 188. It will be appreciated that worm 100 will by means of support 176 and a spring 177 be pressed against teeth 98 whereby the play of the drive becomes very low. By actuating hand wheel 179 arranged on threaded bolt 178 which is connected to support 176, worm 100 disengages teeth 98.

As will be seen in FIG. 18, guide rails 190 may be provided to guide support member 176 in the lateral direction when the worm 100 is engaged with worm wheel 98 or disengaged therefrom.

It has been mentioned that the device can swing freely in the top wall of the vehicle-like frame, and this is accomplished in connection with those devices which employ the adjusting element of FIGS. 13 and 15 by releasing the outer tubular part of the adjusting element for free reciprocal movement through the ball connector which surrounds it.

Thus, the optical device can swing freely until the outer tube is clamped in the ball connector through which it extends, and thereafter tilting of the optical device is accomplished by actuation of the adjusting elements.

It will be noted that the ball connector for the adjusting elements are substantially free of play by virtue of being surrounded by snythetic material which is placed under load by clamping devices.

In respect of the ring 52 of the FIGS. 4, 5 and 6 modification, the arrangement of the bearings is such that preloading of each of the bearings in which the ring is tiltable will preload the other bearings, although each of the bearings can be preloaded individually if so desired.

Both ball and roller type bearings are disclosed for journaling the aforementioned ring, as well as for the bearing pertaining to ring 96 of the FIGS. 10 through 12 modification. In both cases, the lines of action of the rollable elements in the bearings from a cone-like configuration having its apex pointing toward the center of the ring.

In respect of the pairs of bearings pertaining to ring 96, these bearings can be individually preloaded, or preloading can be accomplished by preloading one or more of the bearings and depending on the deflection of the ring to preload the others thereof.

In every case, the optical device is tiltable in all directions in its support in the top wall and is rotatable therein and can be actuated in tilting and rotary movements and arrested in any desired position. The adjusting devices provide for fine movement in all directions and substantially all lost motion is eliminated so that the optical device can be adjusted quite precisely to the desired position and arrested therein.

It is, of course, to be understood that the present invention is, by no means, limited to the specific showing in the drawings but also comprises any modifications within the scope of the appended claims.

What is claimed is:

1. A special cardanic suspension in combination with an armored vehicle, including a frame having a top wall and a floor: a periscope-like optical device movable for fine and coarse adjustment during observation and measurement occurring only out of a stationary vehicle, said device having three rotary degrees of freedom given thereto in a minimum of space and extending through said top wall having a laterally directed objective end above said top wall and a laterally directed viewing end beneath said top wall, first bearing means rotatable about a vertical axis and supporting said optical device, second bearing means swivelly supporting said first bearing means in said top wall, first adjustable means for rotating said optical device in said first bearing means and second adjustable means for adjusting the swivelled position of said optical device in said top wall, a bushing surrounding said optical device, said first bearing means being interposed between said bushing and said second bearing means, said bearing means including preloading means so as to be play free.

2. A suspension in combination according to claim 1, in which said preloading means comprise resilient elements.

3. A suspension in combination according to claim 1, in which said preloading means includes hydraulic means.

4. A suspension in combination according to claim 1, in which said first adjustable means includes a worm wheel formed on the periphery of said bushing, a worm carried by said second bearing means, and means for selectively engaging said worm with said worm wheel.

5. A suspension in combination according to claim 1, which includes a sleeve surrounding said bushing, said sleeve being connected to said second bearing means and including a partially spherical dome portion sealed to said top wall and tiltable therein.

6. A suspension in combination according to claim 1, which includes a sleeve surrounding said bushing, a ring surrounding said sleeve, third bearing means rotatably supporting said ring on said top wall, said second bearing means comprising a pair of diametrally opposite bearings journalling said sleeve on said ring, said second adjustable means being connected between said ring and said sleeve to tilt said sleeve about the axis of said pair of bearings.

7. A suspension in combination according to claim 6, which includes means for adjusting the rotated position of said ring on said top wall.

8. A suspension in combination according to claim 1, which includes a sleeve surrounding said bushing, a ring surrounding said sleeve, a first pair of diametrally opposite bearings journalling said sleeve on said ring, a second pair of diametrally opposite bearings displaced 90° from said first pair and journalling said ring on said top wall, said second adjustable means including a first extensible element connected between said sleeve and said ring to tilt said sleeve about the axis of said first pair of bearings and a second extensible element connected between said ring and said top wall to tilt said ring about the axis of said second pair of bearings.

9. A suspension in combination according to claim 8, in which each extensible element has a play-free ball connection with each of the two members interconnected thereby.

10. A suspension in combination according to claim 8, in which each extensible element comprises an outer tube and a spindle axially adjustable thereon, a rotary adjusting member, and a planetary drive connecting said adjusting member to said spindle.

11. A suspension in combination according to claim 10, which includes means to lock said adjusting members to said outer tube.

12. A suspension in combination according to claim 10, in which said outer tube extends through one of said ball connections and is adapted selectively to be clamped thereto or left free to reciprocate therein.

13. A suspension in combination according to claim 8, in which said pair of bearings are preloaded.

14. A suspension in combination according to claim 8, which includes synthetic material surrounding said balls.

15. A suspension in combination according to claim 9, which includes a drive motor for at least one of said extensible elements.

16. A suspension in combination according to claim 13, in which at least one of said pairs of bearings include hydraulic preloading means.

* * * * *